Oct. 9, 1962     D. A. HAMILTON     3,057,370

THREE-WAY VALVE

Filed Sept. 28, 1959

INVENTOR

DONALD A. HAMILTON

BY *Robert J. Merrick*

United States Patent Office 3,057,370
Patented Oct. 9, 1962

3,057,370
THREE-WAY VALVE
Donald A. Hamilton, Burbank, Calif., assignor to Don Baxter, Inc., Glendale, Calif., a corporation of Nevada
Filed Sept. 28, 1959, Ser. No. 842,673
6 Claims. (Cl. 137—315)

This invention relates to an inexpensive three-way valve and particularly to a valve having certain advantages for use with anesthetics, blood, intravenous solutions, and drainings from body cavities.

The metal three-way valves usually used for medical applications have two intersecting core passages. They are quite expensive and therefore must be cleaned and re-used many times. For medical applications the valves must be scrupulously clean, but this is often difficult because of the very small, tortuous, intersecting core passages. Moreover the small passages are easily plugged by blood, mucus, or tissues. In some applications, such as spinal taps, no lubricant can be used. This makes the valve difficult to adjust and it may sometimes freeze during an important and critical procedure.

In the present metal valves, the valve passages are inside the core where they cannot be seen. To determine the position of the valve, some kind of an indicating device is provided. These indicating devices are confusing and may lead to errors in procedure, especially by new or inexperienced operators.

Disposable plastic valves have been suggested. Such valves would be particularly useful for spinal taps, for administering blood, or for other uses in which it is undesirable to clean and reuse a valve. However, these valves have not been well received because they leak, cost too much, cannot be operated with one hand, or have small, easily-blocked passages.

An object of the invention is therefore to provide an effective, leak-proof, three-way valve which is so inexpensive that it can be discarded after a single use.

Another object of the invention is to provide a three-way valve with passages which will not be blocked by blood, mucus, tissues, or other drainings from body cavities.

Another object of the invention is to provide a three-way valve which is easy to mold and to assemble.

A further object of the invention is to provide a three-way valve which turns easily and smoothly, but which holds adjustment when set.

Figure 1:
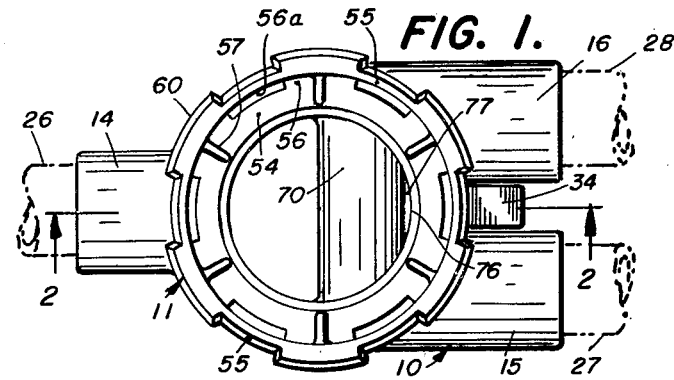
Figure 2:
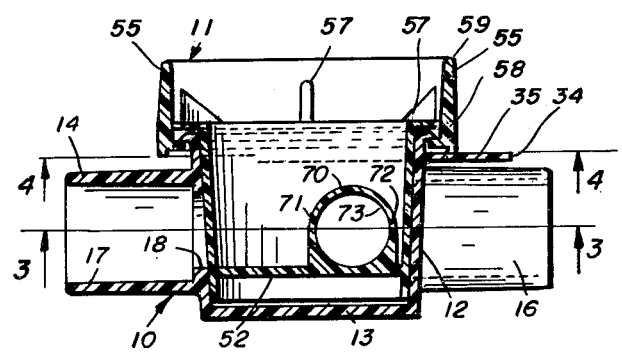
Figure 3:
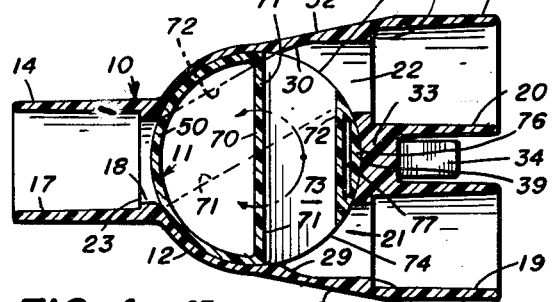
Figure 4:
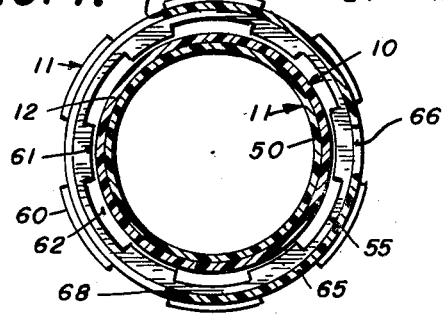
Figure 5:
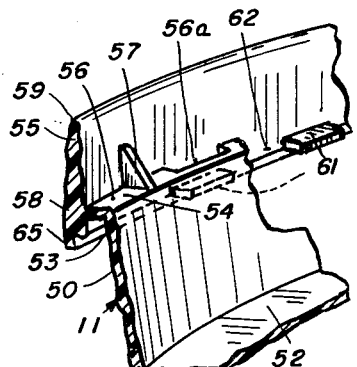
Figure 6:
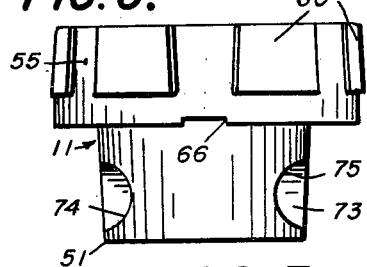
Figure 7:
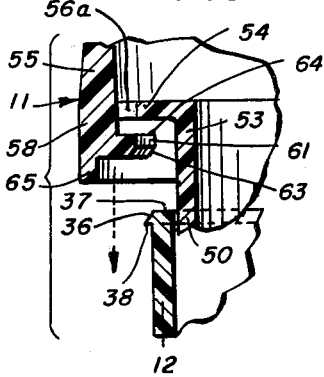

Other objects and advantages of the invention will be apparent from the description of the preferred example of the invention, given in connection with the accompanying drawings in which:

FIGURE 1 is a plan view of the invention;
FIGURE 2 is a sectional view on the line 2—2 of FIGURE 1;
FIGURE 3 is a sectional view on the line 3—3 of FIGURE 2, but with details of the core handle cut away;
FIGURE 4 is a sectional view on the line 4—4 of FIGURE 2;
FIGURE 5 is a perspective view, partially cut away, of the valve core;
FIGURE 6 is an elevational view of the valve core;
FIGURE 7 is an exploded sectional view showing the two component parts of the valve structure detached from each other.

As shown in the drawings, the valve has a body 10 and a rotatable core 11. The body 10 has a thin, tubular plastic wall 12 which tapers inwardly toward the reinforcing bottom wall 13. The top end of body 10 is open. An inlet tube 14 having a passage 17 extends from the body at right angles to its axis. Two outlet tubes 15, 16 having passages 19, 20 extend from the side of the body opposite the inlet tube 14. The respective axes of the inlet and outlet tubes are parallel to each other, are in substantially the same plane, and intersect the inner surface of wall 12 at points approximately 120° of arc away from each other. Thus the three points at which the respective axes intersect the inner surface of wall 12 are substantially equidistant from each other.

The walls of inlet tube 14 intersect and pass through body wall 12 to define an inlet port 18. Likewise, the walls of outlet tubes 15, 16 define outlet ports 21 and 22 at their intersection with wall 12. Outlet ports 21, 22 are oval in shape, the inner edges lying at the juncture of the inner surface of tubes 15, 16 with wall 12. The outer edges of ports 21, 22 also lie at the juncture of the inner surfaces of tubes 15, 16 with wall 12, but in this case tubes 15, 16 are provided with inwardly curving wall sections 29, 30. The curved sections 29, 30 are radiused to provide the same cross-sectional area between the sections and the inner edges of ports 21, 22 as is provided by the passages 19, 20.

The inner surfaces of tubes 14, 15, 16 taper inwardly toward the annular bosses 23, 24, 25 to facilitate convenient attachment of flexible tubes 26, 27, and 28. Alternatively, the inner surfaces may be adapted to receive male Luer taper fittings or tapered administration set spikes. If desired, sterile protectors or breathers containing cotton plugs (not shown) may be placed on the outer surfaces of tubes 14, 15, 16.

The outer surfaces of tubes 15, 16 slant inwardly along the flattened portions 31, 32 so as to provide uniform thin walls at the junctures of the tubes with body 10. For best results, the center point of any given section should be less than 50% further from the nearest surface than the center point of the thinnest section of the body. This also applies to the matching surfaces of core 11. The web 33 connects the outlet tubes 15, 16 together. A first ejector pin flat (not shown) is located below web 33 and a second ejector pin flat is located above web 33. A stop 34 projects outwardly from the second ejector pin flat. Stop 34 preferably has a rectangular cross-section and is relatively thin so that it can be bent downwardly by pressure on its top surface 35 to allow core 11 to turn as will be described later. At the upper or open end of body 10 a rim 37 projects outwardly from the wall 12. Rim 37 has a beveled top surface 36 and a flat bottom surface 38.

Valve core 11 has a thin core wall 50, the outer surface of which is tapered to match the inner surface of body wall 12, and is slightly larger than said inner surface. Core wall 50 terminates at a lower end 51. A bottom 52 closes and reinforces the lower end of core 11, while the upper end is open.

At the top 53 of core wall 50, an annular flange 54 extends outwardly. A cylindrical handle 55 is attached to flange 54 by brackets 56, reinforced by braces 57. Alternating with the brackets 56 are spaces 56a between the flange 54 and handle 55.

The base 58 of handle 55 is thicker than the top 59. The outer surface of handle 55 is provided with finger grips 60 aligned to reinforce the handle at its juncture with brackets 56. Along the handle base 58, and immediately below spaces 56a locking fingers 61 extend inwardly. Fingers 61 have beveled bottom surfaces 63 and flat top surfaces 64. Spaces 62 alternate with the locking fingers 61 and are located immediately below brackets 56.

A skire 65 extends downwardly from handle base 58. The bottom surface of skirt 65 has a narrow notch 66 and a wide notch having sides 67, 68. Within the core 11 and visible through the open upper end of the core, a tube 70 extends across the core bottom 52. Tube 70 is offset to one side of core 11. In the position shown in the dotted lines of FIGURE 3, the inner wall 71 lines up with the inner edge of outlet port 22 and extends across the core at an angle of 120° to the axis of tube 17. The outer wall 72 lines up with the edge of inlet port 18 and extends across the core parallel to inner wall 71. The walls of tube 70 define a central core passage 73 and pass through the core walls 50 to define core ports 74 and 75. Core ports 74 and 75 are slightly larger than inlet port 18, but substantially equal in size to outlet ports 21, 22. The inner surface of smaller section 76 of core wall 50 defines with the outer surface of tube 70 the small space 77.

As shown in FIGURE 7, the three-way valve is assembled by placing the closed end of core 11 in the open end of valve body 10 and pushing them together until the locking fingers 61 of core 11 snap over the rim 37 of body 10. Tapered core walls 50 then fit snugly into the tapered body walls 12. The lower end 51 of core wall 50 is located about 0.010 inch above the bottom 13 of the valve body and the core flange 54 is located 0.001 to 0.005 inch above the top of rim 37. The upper finger surface 64 presses against the bottom rim surface 38 urging core 11 tightly into body 10.

The lower surface of core skirt 65 rides against the upper surface 35 of stop 34, so that the stop will rise into notches 66, 67—68. The section 76 between core ports 74 and 75 is larger than the body ports 18, 21 and 22, so that the ports can be completely closed off in various positions of the valve. Likewise the section 39 of the body wall between outlet ports 21, 22 is larger than the core ports 74 and 75 so that both ends of core passage 73 can be closed off in several positons.

The body 10 and core 11 may be made of plastic materials such as polyvinyl chloride, polypropylene, nylon, linear polyethylene, or Delrin. Polyvinyl chloride is a particularly suitable material because of its low shrinkage on molding. However, a lubricant may be required when both parts are made of polyvinyl chloride and fit tightly together. An even better structure is obtained when one of the parts is made of linear polyethylene, and the other of polypropylene. In this combination, I have found that an unexpectedly low coefficient of friction exists between these materials. Thus the valve may be turned easily even though the parts fit together very tightly.

In operation, the body 10 may be held in one hand while the handle 55 is turned with the fingers of the same hand. As shown in FIGURE 3, core passage 73 may be set to connect inlet passage 17 to either of the outlet passages 19, 20. When the valve is in one of these positions, the stop 34 rests against one of the sides 67, 68 of the wide notch. By pressing stop 34 down, it may be released and passage 73 set to connect the two outlet tubes 19, 20 together. In this position stop 34 rises into the narrow notch 66. With the stop released, passage 72 may also be positioned so that one end is closed by the body section 39. In this position the other end of passage 73 is closed by a portion of the body wall 12 near inlet tube 14, so that both ends of core passage 73 are closed off. This gives double assurance against any leakage through the core passage.

In the use of this valve, almost no problem has been encountered with leakage. This rather surprising result is apparently due to the very close tolerances with which the thin walls of body 10 and core 11 can be molded. By minimizing shrinkage, especially on the matching surfaces of the two parts, unexpectedly good results are obtained. A further feature in preventing leakage is the presence of a web 33 between the outlet ports 15, 16. In the absence of web 33, any force exerted on the outlet tubes 15, 16 tends to deform the body wall 12 causing leakage.

The valve is particularly useful in applications where it is desirable for the inlet and outlet passages to be parallel to each other. One such use is in the administration of an intravenous solution. In this application, the inlet tube 14 is connected to the container of solution and an administration set is inserted in outlet tube 15. As is customary in the art, the administration set should include a drop meter for determining the rate of flow of solution. Such drop meters must hang in a vertical position in order to operate properly and this is convenient only when outlet tube 15 and inlet tube 14 are parallel. The parallel position of the tubes also facilitates cleaning of the valve with a pipe cleaner or other flexible device which may be passed through passages 17, 73, and 19 or 20.

Th straight, open passage of both the body 10 and core 11 facilitate cleaning of the parts before assembly. The valve can be made and assembled so inexpensively that re-use of the valve does not appear likely. There may, however, be times when it is desirable to disassemble and clean a valve. In such a case, the core 11 may be removed from body 10 by inserting a pry between one of the tubes 14, 15, 16 and the core skirt 65.

The terms inlet and outlet have been used in this application for convenience. It is understood, of course, that the inlet tube 14 may be used as an outlet tube and that either or both of the outlet tubes 15, 16 may be used as inlet tubes without departing from the scope of the invention. Likewise, numerous other changes in construction and rearrangement of the parts might be made without departing from the scope of the invention.

I claim:

1. A three-way valve comprising: a body; an inlet and two outlet tubes extending from said body; a rim projecting outwardly from the top of the valve body; a core rotatable in the body and having a core passage across one side of the core, said passage being adapted to connect the inlet tube to one of the outlet tubes, reversible to connect the inlet tube to the other of said outlet tubes and further reversible to connect the two outlet tubes to each other; an annular flange extending outwardly from the top of the valve core; a rigid, cylindrical core handle, larger in diameter than the core attached to said flange by brackets spaced intermittently around the flange; a portion of the handle extending downwardly and telescoping with the top portion of the valve body; and resilient, displaceable locking fingers spaced around said handle portion and alternating with the brackets, said fingers extending inwardly to engage the lower surface of the body rim.

2. A three-way valve as set forth in claim 1 wherein a skirt extends downwardly from the handle portion; a stiff, resilient, downwardly displaceable stop extends outwardly from the valve body; and notches, adapted to engage the stop to indicate the position of the core tube, are provided in said skirt.

3. A three-way valve as set forth in claim 2 wherein a web connects the outlet tubes together and the stop is located immediately above the web.

4. A three-way valve comprising: a body; an inlet tube extending from one side of said body; two outlet tubes parallel to said inlet tube and extending from the side of the body opposite the inlet tube, said outlet tubes having thin, generally cylindrical walls and being spaced from each other, and said body having thin, resilient walls subject to distortion by forces exerted on one of the outlet tubes; a core rotatable in the body; a passage extending across one side of said core, said passage being adapted to connect the inlet tube to one of the outlet tubes, reversible to connect the inlet tube to the other of said outlet tubes, and further reversible to connect the two outlet tubes to each other; and a thin, transverse web rigidly attached to the wall of each of the outlet tubes near to the body, whereby distortion of the body by forces exerted on one of the outlet tubes is substantailly reduced.

5. A three-way valve as set forth in claim 4 wherein the transverse web is rigidly attached to the portion of the body wall between the outlet tubes.

6. A three-way valve comprising: a thin-walled plastic body; three parallel tubes extending from said body; ports in the body wall communicating with the tubes, said ports being spaced around the body at approximately 120° from each other; a hollow, thin-walled, plastic core rotatable in said body; a cylindrical handle extending from said core and having its extended axis common therewith; a passage extending across said core, said passage being disposed to one side of the center of the core and adapted to connect any of the tubes with any other of said tubes; imperforate core wall sections between the respective passage ends, one of said sections being larger than any of the ports, the other of said sections being sufficiently large to extend from one side of any port to the far side of either of the other ports; and an imperforate section of the body between each of the ports larger than the diameter of the core passage, said body being made of a material consisting either of a linear polyethylene polymer or a polypropylene polymer and the core rotatable in said body being made of the other polymer.

References Cited in the file of this patent

UNITED STATES PATENTS

| | | |
|---|---|---|
| 967,460 | Straub | Aug. 16, 1910 |
| 1,674,743 | Rudolph | June 26, 1928 |
| 2,621,013 | Mansfield | Dec. 9, 1952 |
| 2,661,019 | Snyder | Dec. 1, 1953 |
| 2,832,562 | Myers | Apr. 29, 1958 |
| 2,964,056 | Speer | Dec. 13, 1960 |

FOREIGN PATENTS

| | | |
|---|---|---|
| 519,374 | France | of 1921 |